(12) United States Patent
Ogawa

(10) Patent No.: US 7,577,275 B2
(45) Date of Patent: Aug. 18, 2009

(54) IMAGE PROCESSING SYSTEM

(75) Inventor: Genya Ogawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 892 days.

(21) Appl. No.: 11/218,564

(22) Filed: Sep. 6, 2005

(65) Prior Publication Data

US 2006/0050928 A1  Mar. 9, 2006

(30) Foreign Application Priority Data

Sep. 7, 2004  (JP)  ............... 2004-259987

(51) Int. Cl.
*G06K 9/00* (2006.01)
*H01L 27/00* (2006.01)
(52) U.S. Cl. .................... 382/103; 250/208.1
(58) Field of Classification Search .......... 382/103
See application file for complete search history.

(56) References Cited

U.S. PATENT DOCUMENTS 7,176,432 B2 * 2/2007 Komiya ............... 250/208.1

FOREIGN PATENT DOCUMENTS

JP  1-233578  9/1989
JP  7-91914  4/1995

OTHER PUBLICATIONS

Automatic Construction of Tree-structural Image Transformations Using Genetic Programming. Shinya Aoki and Tomoharu Nagao; Image Analysis and Processing, 1999. Proceedings. International Conference on Sep. 27-29, 1999 pp. 136-141.*

* cited by examiner

*Primary Examiner*—Samir A. Ahmed
*Assistant Examiner*—Michael Vanchy, Jr.
(74) *Attorney, Agent, or Firm*—Smith, Gambrell & Russell LLP

(57) ABSTRACT

In image processing system for detecting a target object in image data, featuring a plurality of image processing units at least some having an image filter for conducting an image process which facilitates detection of the target object in the image data. The image processing units are formed as a hierarchy structure. By inputting a plurality of image data which is utilized in the image process to a first two-input logical product filter for integrating a plurality of image data, target object detection is facilitated.

20 Claims, 11 Drawing Sheets

IMAGE PROCESSING SYSTEM

CROSS REFERENCE TO RELATED APPLICATIONS

The disclosure of Japanese Application No. 2004-25987 filed on Sep. 7, 2004 including the specification, drawing and abstract is incorporated herein by reference in its entirety.

FIELD OF THE INVENTION

The present invention relates to an image processing system which extracts a target object such as a landing point of a heliport, preferably through use of an image processing unit that extracts the landing point by a plurality of image filters formed as a hierarchy structure.

BACKGROUND OF THE INVENTION

For example, generalized Hankel Fourier transformation is mainly used to extract a circle (touchdown zone mark of the heliport) in the image taken by a camera. This kind of method is disclosed in references such as Japanese Patent Laid-Open No. 7-91914 and Japanese Patent Laid-Open No. 1-233578.

Furthermore, the extraction of a particular configuration such as a circle can be conducted with a publicly used filter. However, it is difficult to extract a particular configuration with only an independent filter, so plural filters combined in sequence are used for extracting the particular configuration.

However, it was difficult to extract a particular configuration from a complicated figure by these sequentially combined filters.

SUMMARY OF THE INVENTION

An object of the invention is to address the aforementioned extraction problem, with the present invention being designed to extract a particular configuration in a complicated image, as in a touchdown zone mark of a heliport, by putting a filter together that helps attain the object. A preferred embodiment of the invention includes an image processing system for detecting a target object from an image ata that comprises a plurality of image processing units having an image filter for conducting the image process to detect the target object in the image data, and a first two-input logical product filter for integrating a plurality of image data, wherein the integrated plurality of image data is processed under the image process to extract a configuration from a complicated figure as in a landing zone pattern within a heliport complicated image.

DETAILED DESCRIPTION OF THE PREFERRED EMBODIMENTS

An embodiment of the present invention is explained with figures. However, the scope of the invention is not intended to be limited by the illustrated embodiments of the figures.

Figure 1:
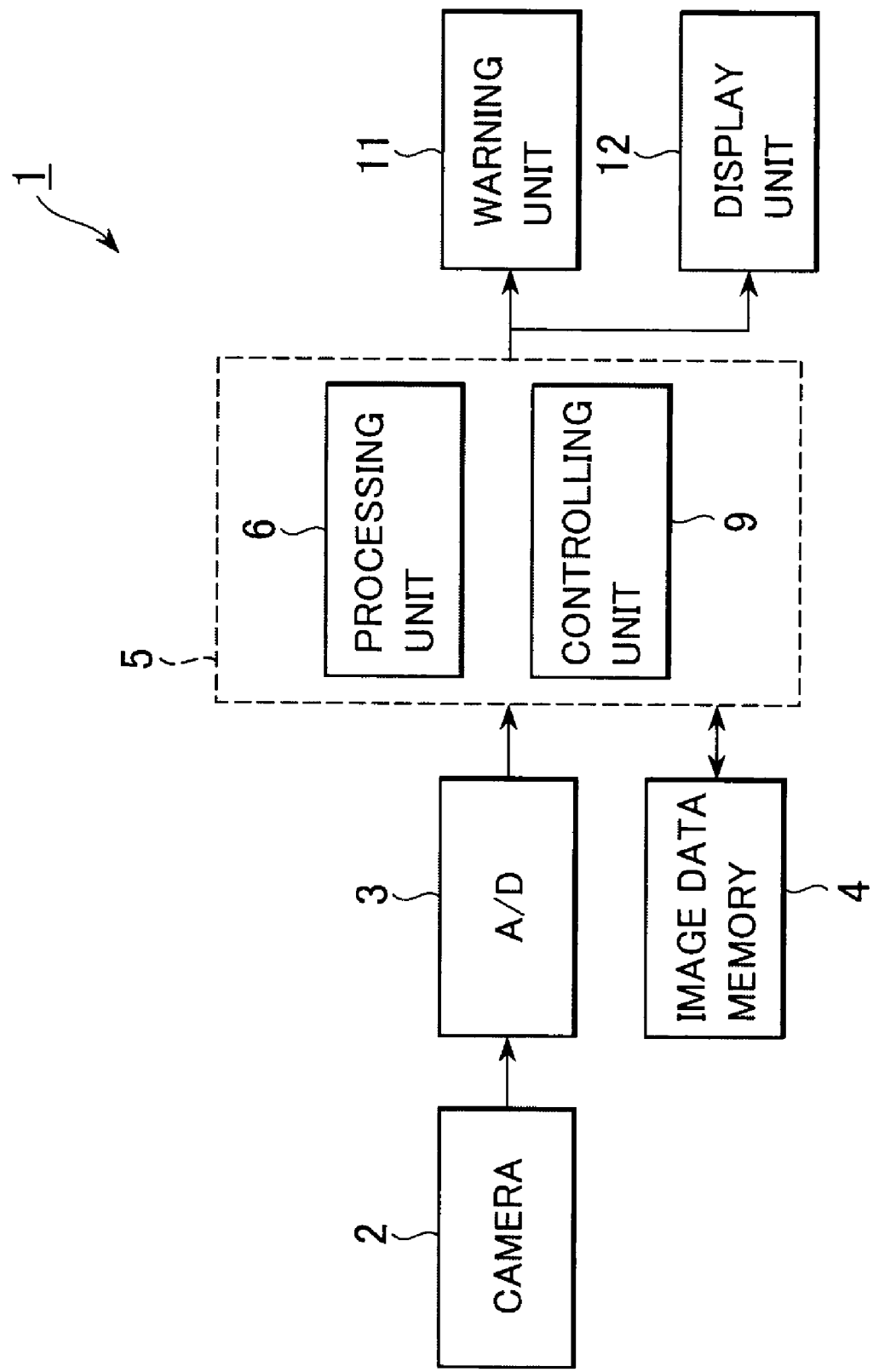
FIG. 1 is a block diagram showing an image processing system according to the present embodiment.

As shown in a block diagram of FIG. 1, an image processing system 1 of the present invention comprises camera 2, analog-to-digital converter 3 (described in FIG. 1 as A/D), image data memory 4, micro-computer 5, processing unit 6, controlling unit 9, warning unit 11 and display unit 12. When the image processing system 1 processes the image of touchdown zone mark of a heliport, the camera 2 is assembled to, for example, an airframe inferior segment of a helicopter, which facilitates the touchdown zone mark of a heliport being photographed or imaged.

The camera 2, as image sensor for making an image by signaling light, comprises, for example, a CCD or CMOS image sensor.

The analog-to-digital converter 3 converts an analog image provided by the image sensor in digital image of a predetermined brightness gradation (for example, gray scale of 256 gradation).

The image data memory 4 stores the digital data from the analog-to-digital converter 3. And, the processing unit 6 uses this digital data in the image processing as the original image X.

The illustrated microcomputer 5 comprises a CPU, ROM, RAM and I/O interface, and, a preferred embodiment is functionally divided into processing unit 6 and controlling unit 9.

Figure 2:
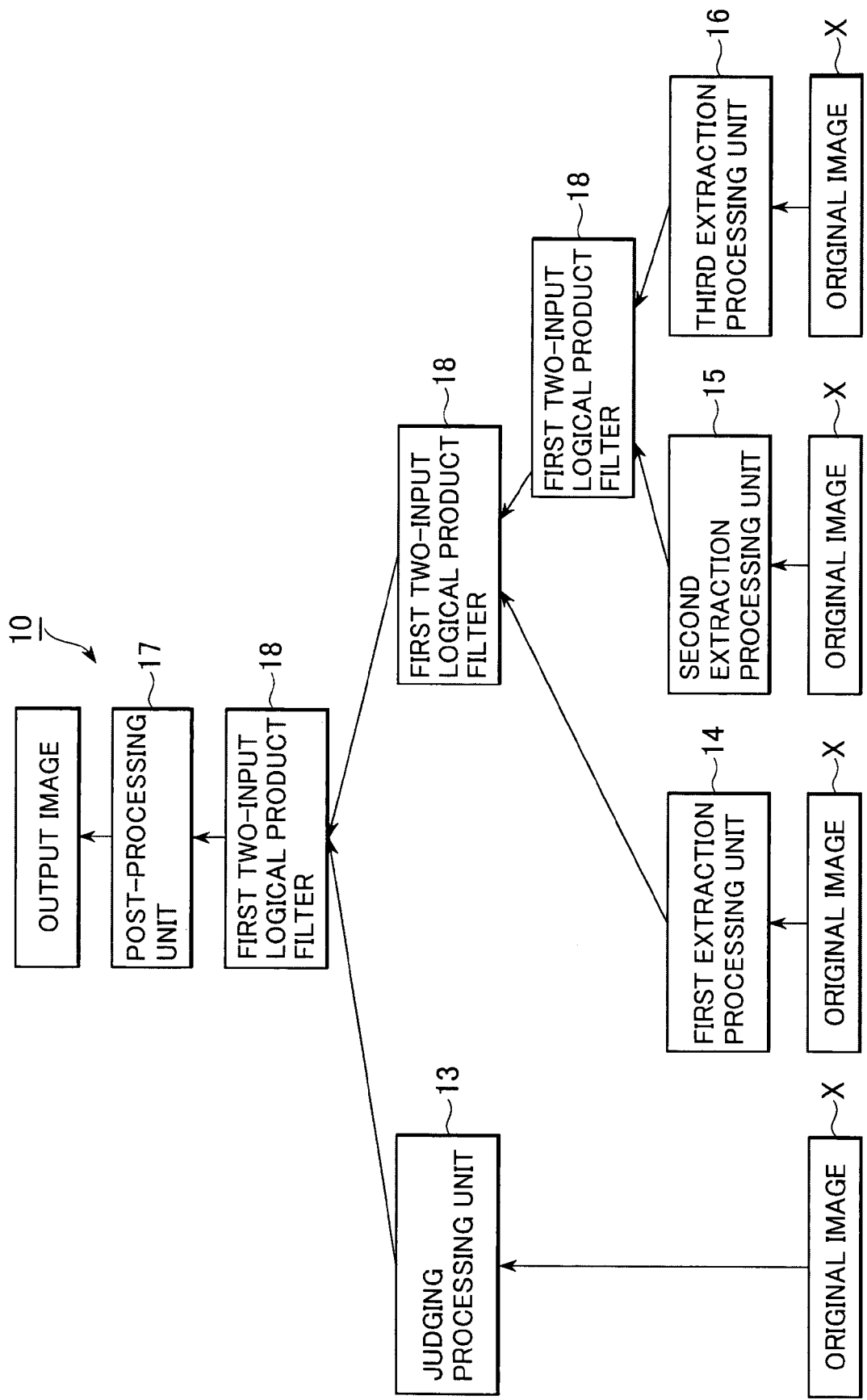
FIG. 2 is a schematic drawing showing a hierarchy structure shaped filter according to the present embodiment.

In processing unit 6, tree structure filter 10, as shown in FIG. 2, is used to extract a target object from the digital image. A prescribed image processing is carried out on the original image X read-out from the image data memory 4 with this tree structure filter 10. The tree structure filter 10 preferably comprises a judging processing unit 13, a first extraction processing unit 14, a second extraction processing unit 15, a third extraction processing unit 16, a post-processing unit 17, and first two-input logical product filters 18.

Figure 3:
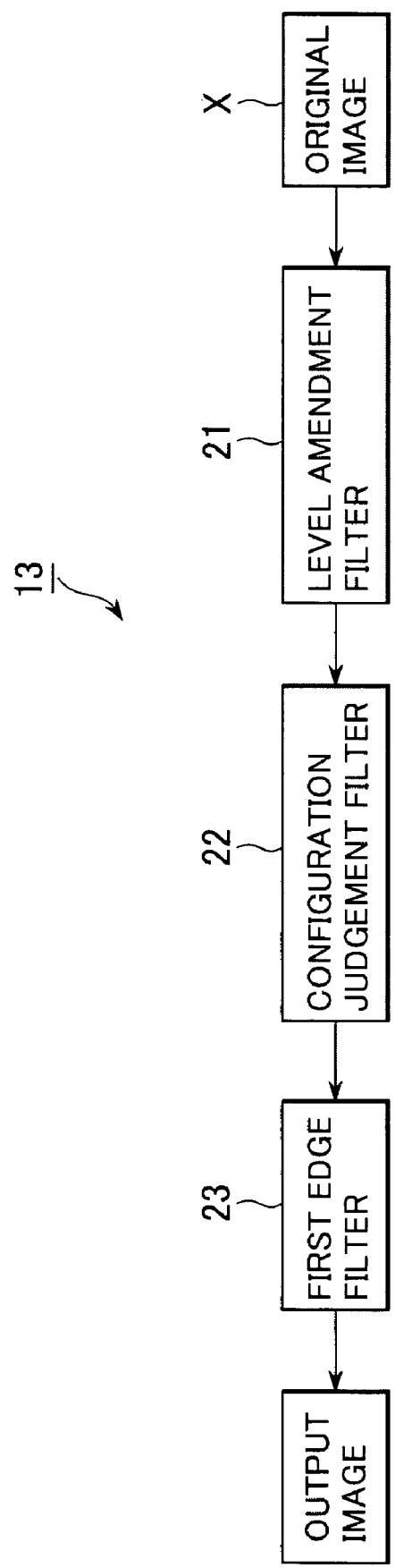
FIG. 3 is a block diagram showing judgment processing unit according to the present embodiment.

As shown in FIG. 3, the judging processing unit 13 comprises a level amendment filter 21 for making the contrast of the original image X clearer, a configuration judgment filter 22 for conducting a prescribed image processing to the image output from the level amendment filter 21, and a first edge filter 23 for detecting an edge from the image output from the configuration judgment filer 22.

Figure 4:
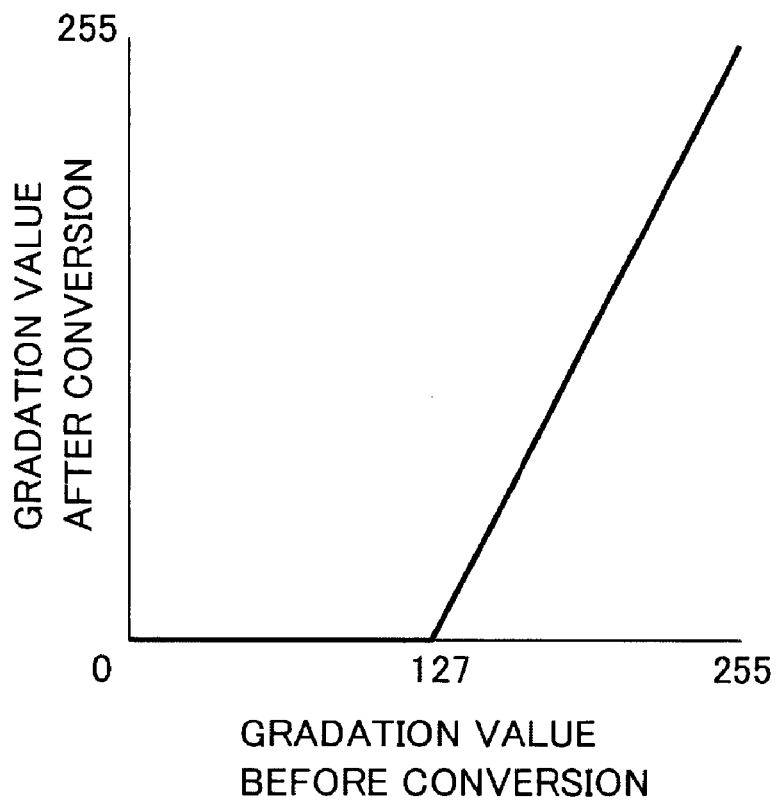
FIG. 4 is a chart showing a relation between the gradation value before a conversion and the gradation value after the conversion, wherein the conversion is carried out through use of a level amendment filter.

The level amendment filter 21 sets to, for example "0", a gradation value for all pixels having gradation value of less than or equal to a prescribed threshold value in the pixels comprising the input image, and conducts the image processing for transforming the gradation value from 0 to an absolute maximum gradation value for the gradation value of pixels having a gradation value of more than a predetermined threshold. FIG. 4 shows the chart that presents correspondence of gradation values of the image before an image processing to gradation value of pixels after the image before an image processing to gradation value of pixels after the image processing, wherein the image processing is conducted by the level amendment filter 21. In general, as for in the image of the touchdown zone mark of a heliport, the range of gradation value is small, and a contrast of the image of the touchdown zone mark of a heliport can be made clearer by conducting image processing shown in FIG. 4. A user can establish the prescribed threshold value based on the user's preference amongst the range of threshold value choices available (e.g., a preferred value is a half value of the greatest gradation value).

Figure 5:
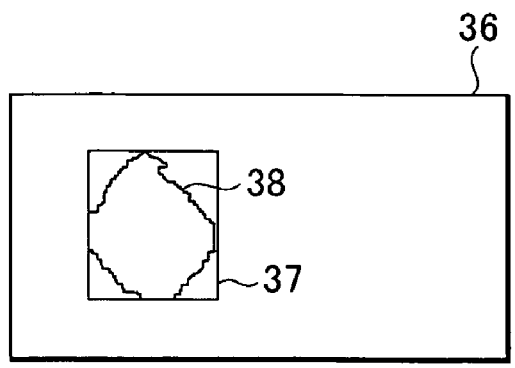
FIG. 5 is a view explaining the image processing with a configuration judgment filter.

In the configuration judgment filter 22, the following image processing is conducted. That is, at first a grouping process is conducted by binarizing the image with a predetermined threshold. After that, as for example shown in FIG. 5, if a grouped area 38 surrounded with rectangular frame 37 in the image 36 does not occupy a prescribed proportion, this grouped area 38 is erased. In addition, a user can establish the prescribed proportion based on the users preference amongst the range of threshold values available.

The edge filter 23 is a filter for detecting an edge of the image. A variety of edge filters can be used having the capability of detecting an edge, as in, for example, a Roberts filter or a Forsen filter. A preferred embodiment has a high-pass filter for extracting an intense portion of a gradation value change. The purpose of detection of an edge in a preferred use of the present invention is to clarify a configuration contour in a touchdown zone mark of a heliport. Therefore, for example, when a high-pass filter is used, a user can establish the threshold value depending on the image, again, preferably based on the user's preference amongst the range of threshold valves available.

Figure 6:
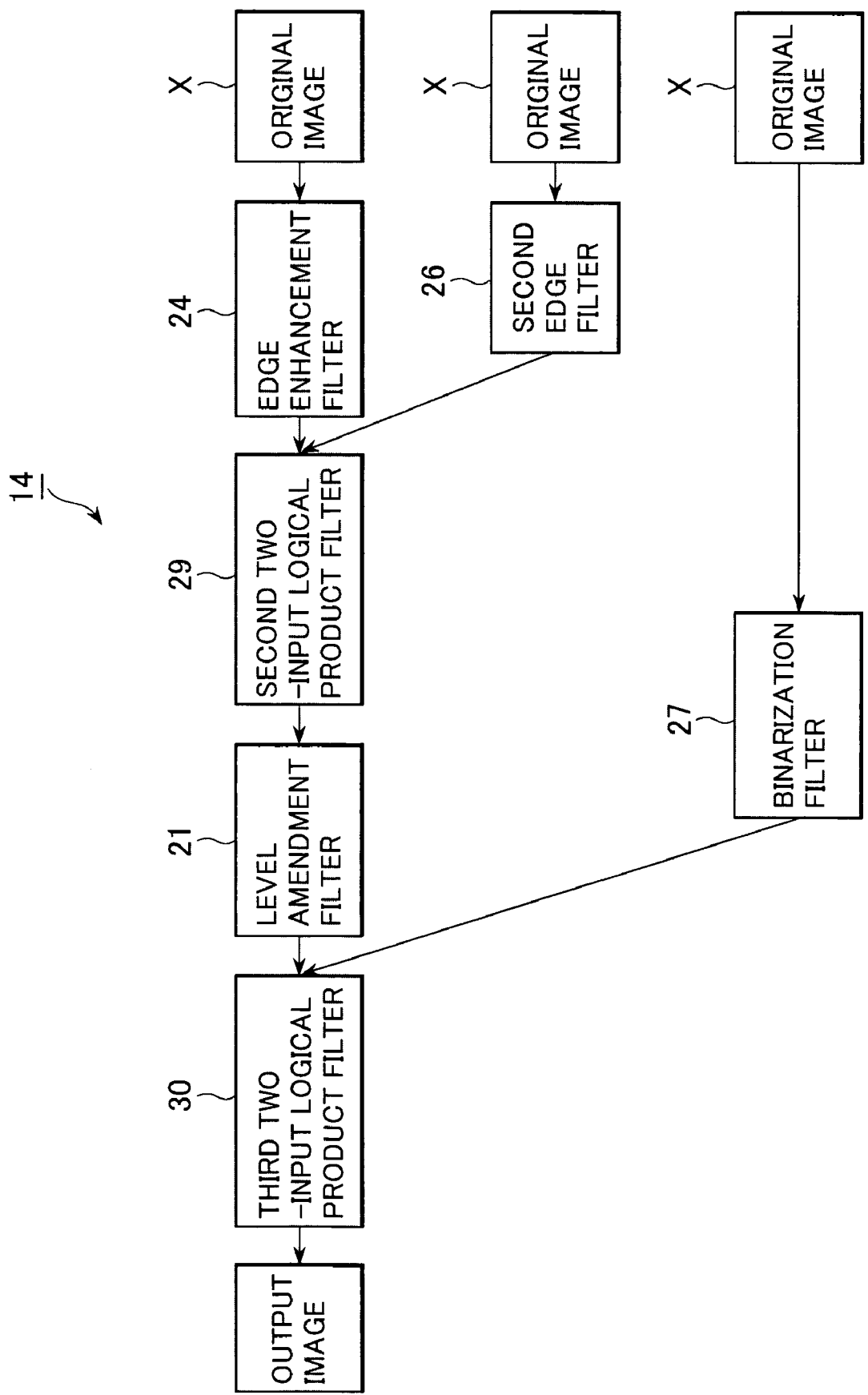
FIG. 6 is a block diagram showing the first extraction processing unit.

As shown in FIG. 6, the first extraction processing unit 14 comprises an edge enhancement filter 24, a second edge filter 26, a binarization filter 27. The edge enhancement filter 24 is a filter to emphasize the edge comprised by the original image X. The second edge filter 26 is a filter for detecting an edge in the original image X separately from the edge enhancement filter 24. And the binarization filter 27 is a filter to binarize the original image X separately from those filters.

Furthermore, the first extraction processing unit 14 comprises a second two-input logical product filter 29 and a level amendment filter 21. The second two-input logical product filter 29 integrates the image output from the second edge filter 26 with the image output from the edge enhancement filter 24. The level amendment filter 21 conducts image processing for making contrast clear about the image output from the second two-input logical product filter 29. The first extraction processing unit 14 further comprises a third two-input logical product filter 30 which integrates the image output from binarization filter 27 with the image output from the level amendment filter 21.

Figures 7, 8:
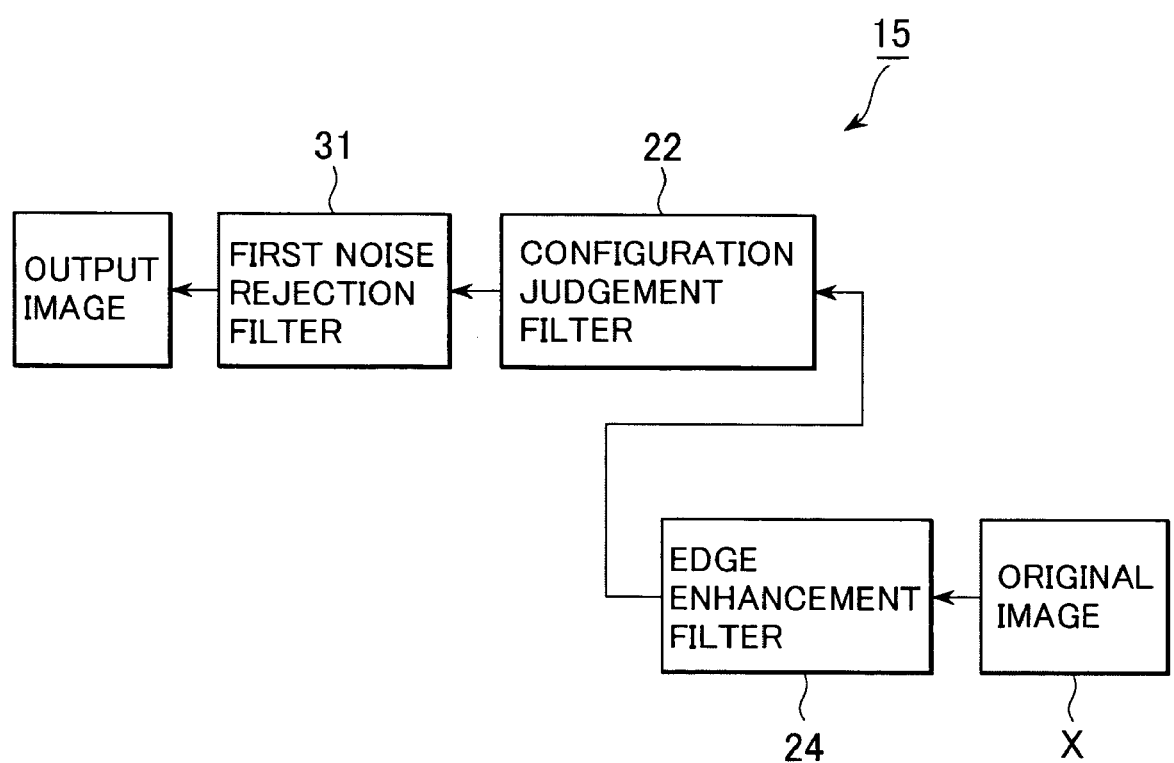
FIG. 7 is a view showing an edge enhancement filter.
FIG. 8 is a block diagram showing the second extraction processing unit.

The edge enhancement filter 24 is a filter to emphasize an edge in the image as in, for example, a known filter such as Laplacian filter. For instance, a preferred filter is representing by filter 25 shown in FIG. 7. This filter 25 is a filter forming the image which emphasizes the line and edge of an image based on an image processing for calculating differentiation of gradation value. This filter comprises a multiplier coefficient as shown in FIG. 7 as in one with nine gradation values, including a chosen observation pixel and the surrounding pixels above, below and to opposite sides of the observation pixel (e.g. a 9 point pixel rectangle). The value that is added up or determined based on this the consequence is adopted as a new gradation value. By conducting the filtering process with filter 25, as advantageous effect of giving an upgraded intensity value of an edge to the original image can be obtained.

The second edge filter 26 is a filter to extract an edge of the image. A variety of filter types capable of detecting an edge can be used. In a preferred embodiment a Sobel filter is used.

The binarization filter 27 is a filter for converting the image to the binary image which has only the greatest gradation value or minimum gradation value. For example, the digital image which has 256 phases of gradation values from gradation value 0 to 255 sequentially from low density pixel, is converted in the binary image which has only minimum gradation value (if there are 256 phases from gradation value 0 to 255, set to 0) or absolute maximum gradation value (if there are 256 phases from gradation value 0 to 255, set to 255). This filter sets the output pixel value which value is more than threshold to the absolute maximum gradation value, and the output pixel value which value is less than or equal to a threshold to lowest gradation value. Threshold, in a preferred embodiment of the present embodiment is preferably set to the mean value of gradation value of all pixels comprising the image.

The second two-input logical product filter 29 has the following characteristics. In filter 29, the value for that multiplied gradation value of pixel of corresponding position of two-input image data is calculated. And this value is divided by the greatest gradation value. As thus described, filter 29 is a filter outputting the image which is assumed from the calculated value of the gradation value of each pixel.

The third two-input logical product filter 30 is a filter having the following characteristics. In filter 30, among pixels corresponding to each other in two-input image data, the third two-input logical product filter 30 outputs the image for which a larger gradation value of pixel is set as gradation value of each pixel.

As shown in FIG. 8, the second extraction processing unit 15 comprises an edge enhancement filter for emphasizing the edge of the original image X, and the configuration judgment filter 22 for conducting a prescribed image processing to the image output from the edge enhancement filter 24. In addition, FIG. 8 shows the first noise rejection filter 31 for removing noise of high frequency component from the image output from the configuration judgment filter 22.

The first noise rejection filter 31 is a filter for removing the high frequency component of which noise often exhibits much. A low-pass filter can be used, however, it is preferably used with other noise filters as in high-pass/low-pass filter combinations.

Figure 9:
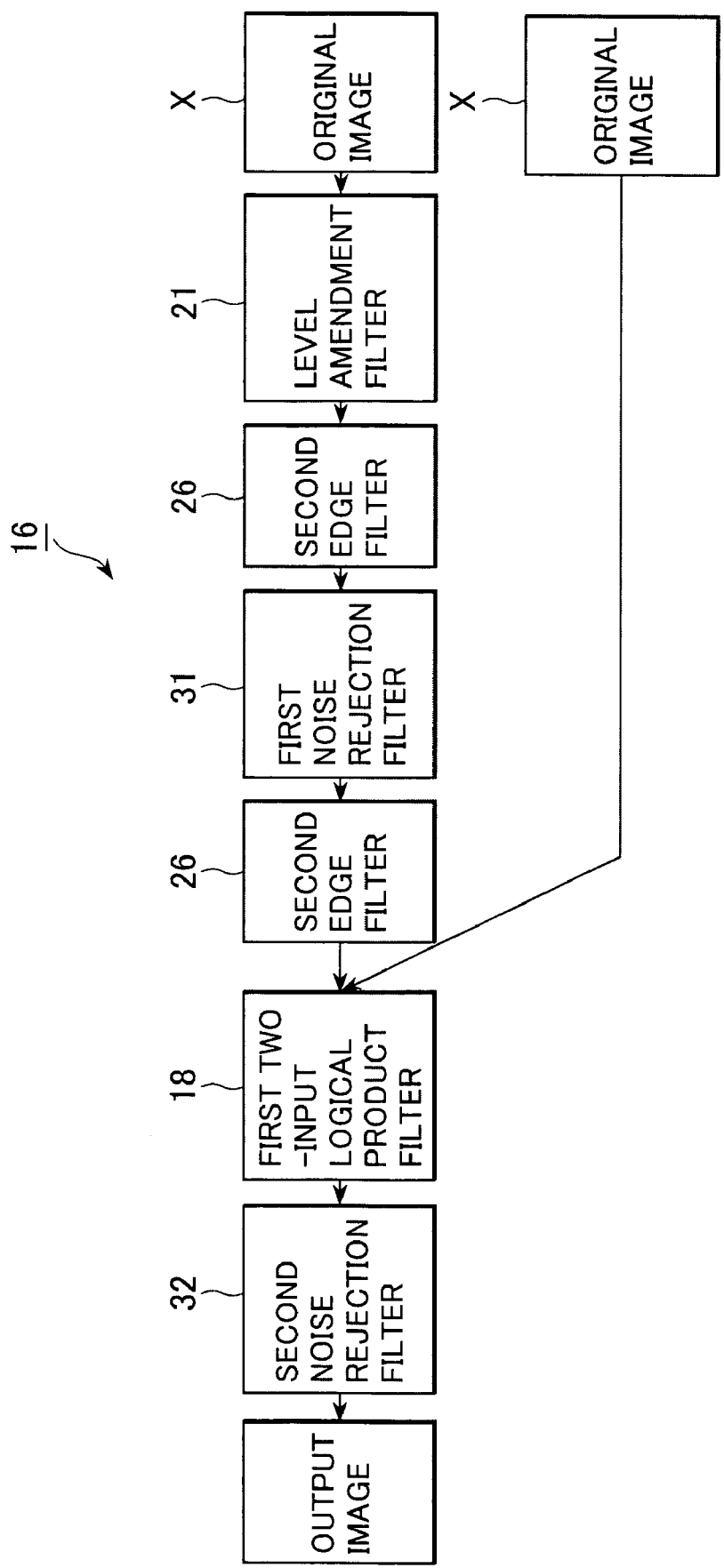
FIG. 9 is a block diagram showing the third extraction processing unit.

As shown in FIG. 9, the third extraction processing unit 16 comprises a level amendment filter 21 for making contrast clear about the original image X, and a second edge filter 26 for detecting an edge from the image outputted from the level amendment filter 21. In addition, the third extraction processing unit 16 comprises a second edge filter 26 for detecting an edge in the image output from the first noise rejection filter 31, and a first noise rejection filter 31 for removing noise of high frequency component from the image output from the second edge filter 26 (e.g., a shared edge filter or individual edge filters as represented by the common reference numbering in the drawings, although it is understood that for all components discussed herein and having common reference numbers amongst the various extraction filters and the like, there can be utilized individual components or combinations of some and individualized variations of others—with the shared use being preferred where possible for efficiency in structure and processing).

Furthermore, FIG. 9 shows the first two-input logical product filter 18 which integrates the original image X with image output from the second edge filter 26, and a second noise rejection filter 32 for removing the noise in the image output from the first two-input logical product filter 18.

The second noise rejection filter 32 preferably removes the noise in the image (the noise is represented by the dots in the image). A variety of noise filters can be used in the present invention, such as a minimum filter or a median filter, although a maximum filter is desirable. The maximum filter replaces a gradation value of the observation pixel with a maximum value (e.g., 3*3 nine pixels or nine pixel block) found amongst the vicinity pixels.

The first two-input logical product filter 18 has the following characteristics. For pixels corresponding to each other in two images, when absolute maximum gradation value in the image was subtracted from the sum of gradation value of pixels corresponding to each other, the filter outputs 1 if the difference is a positive number or 0, and the filter outputs 0 if the difference is a negative number.

In addition, in the case the binary image is input, the same as AND operation, the first two-input logical product filter outputs 1 when gradation values of corresponding pixels are 1, and outputs 0 in the other case.

Figure 10:
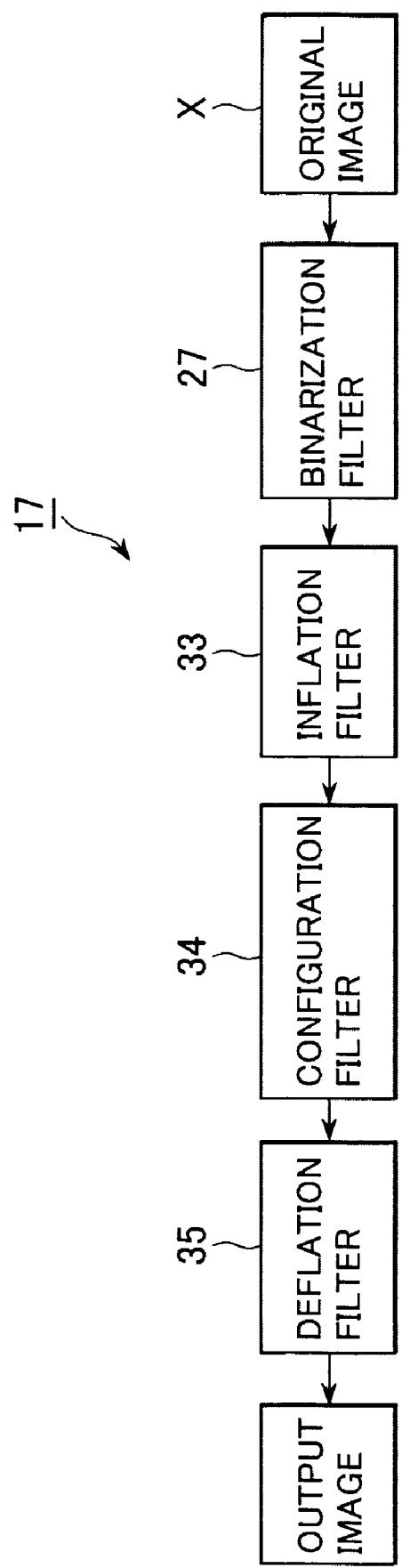
FIG. 10 is a block diagram showing post-processing unit.

As shown in FIG. 10, a post-processing section 17 comprises a binarization filter 27 for binarizing the original image X, and an inflation filter 33 for inflating the image output from the binarization filter 27. In addition, a configuration filter 34 for conducting a prescribed image processing about the image output from the inflation filter 33, and deflation filter 35 for contracting the image output from configuration filter 34 are further featured in post-processing section 17.

The inflation filter 33 is the filter for expanding the figure in the image with a predetermined range toward the background. That is to say, the filter converts a point in a background next to a contour of a figure (gray level 0) to a point in a figure (gray level 1). A preferred embodiment of the configuration filter 34 carries out the following process. At first, the input image is grouped by binarizing with a predetermined threshold. If the grouped region does not occupy greater than or equal to a prescribed proportion in a rectangle region which surrounds the grouped region once circumscribed, it erases the grouped region.

The deflation filter 35 is the filter for deflating the figure in the image with a predetermined range toward inside of the figure. That is to say, the filter converts a figure point (gray level 1) or a figure point forming the contour of a figure and inward figure point nearby to the figure point forming the contour of the figure (gray level 1) to a background point (gray level 0).

Next, the operation of an embodiment of the present invention is explained with an example for extracting a circle of the touchdown zone mark of a heliport.

At first, an analog image taken by camera 2 is converted to the digital image made by the analog-to-digital converter 3. The digital image is stored to the image data memory 4 as original image X.

Next, the processing unit 6 reads the image data from the image data memory 4. This read image data as the original image X is utilized by the image processing in each of the judging processing unit 13, the first extraction processing unit 14, the second extraction processing unit 15, and the third extraction processing unit 16.

The function of the second extraction processing unit 15 is explained.

At first, in the second extraction processing unit 15, the process for enhancing an edge in the original image X by the edge enhancement filter 24 is conducted. After binarizing the image for which the edge is enhanced by the configuration judgment filter 22, an area of a combined figure in the image is assumed based on quantity of characteristic, and in the case of there being a circle having an area higher than a predetermined area in the original image X, there is carried out an image processing to extract the inside and outside of contour of the circle.

In contrast, in the case of the circle having an area less than or equal to a predetermined area, the image processing for extracting only inside of contour of the circle is conducted. And, after removing the noise with the first noise rejection filter 31, the image is output from the second extraction processing unit 15.

Figure 11:
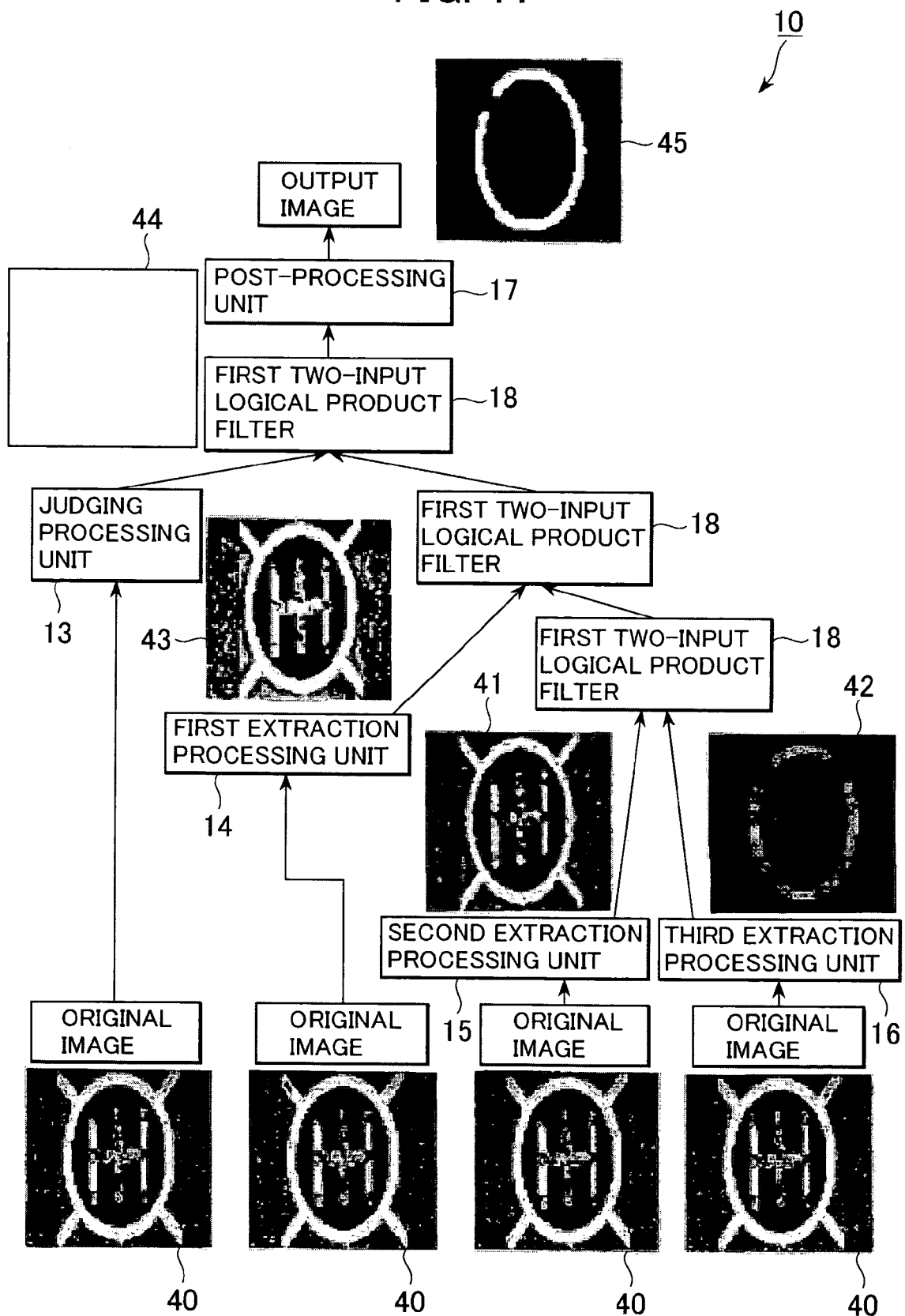
FIG. 11 is a view showing a frame format of image processing, in the case of a circle that is more than a predetermined size being included in an original image.
Figure 12:
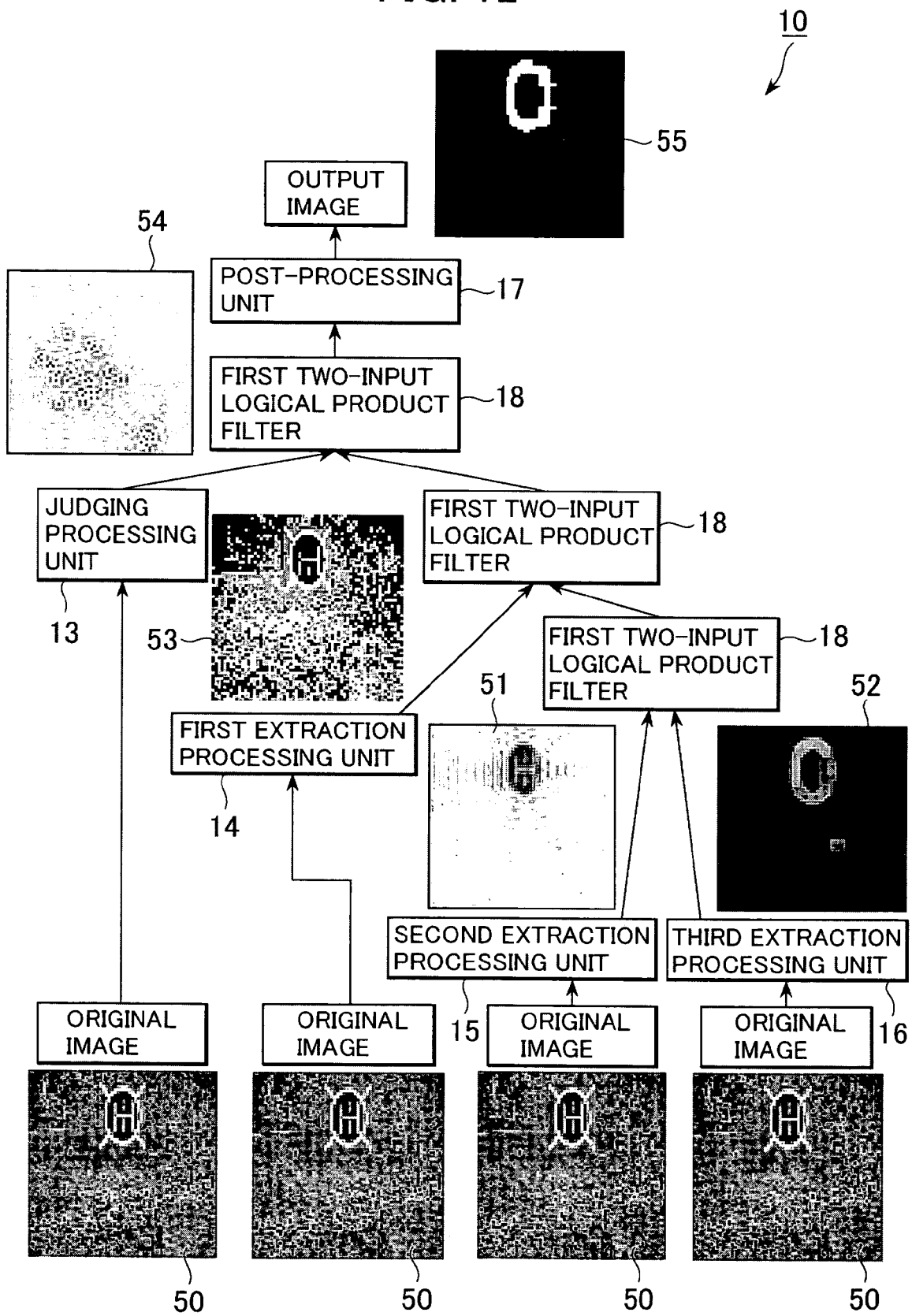
FIG. 12 is a view showing a frame format of image processing, in the case of a circle that is less than or equal to a predetermined size being included in an original image.
Figure 13:
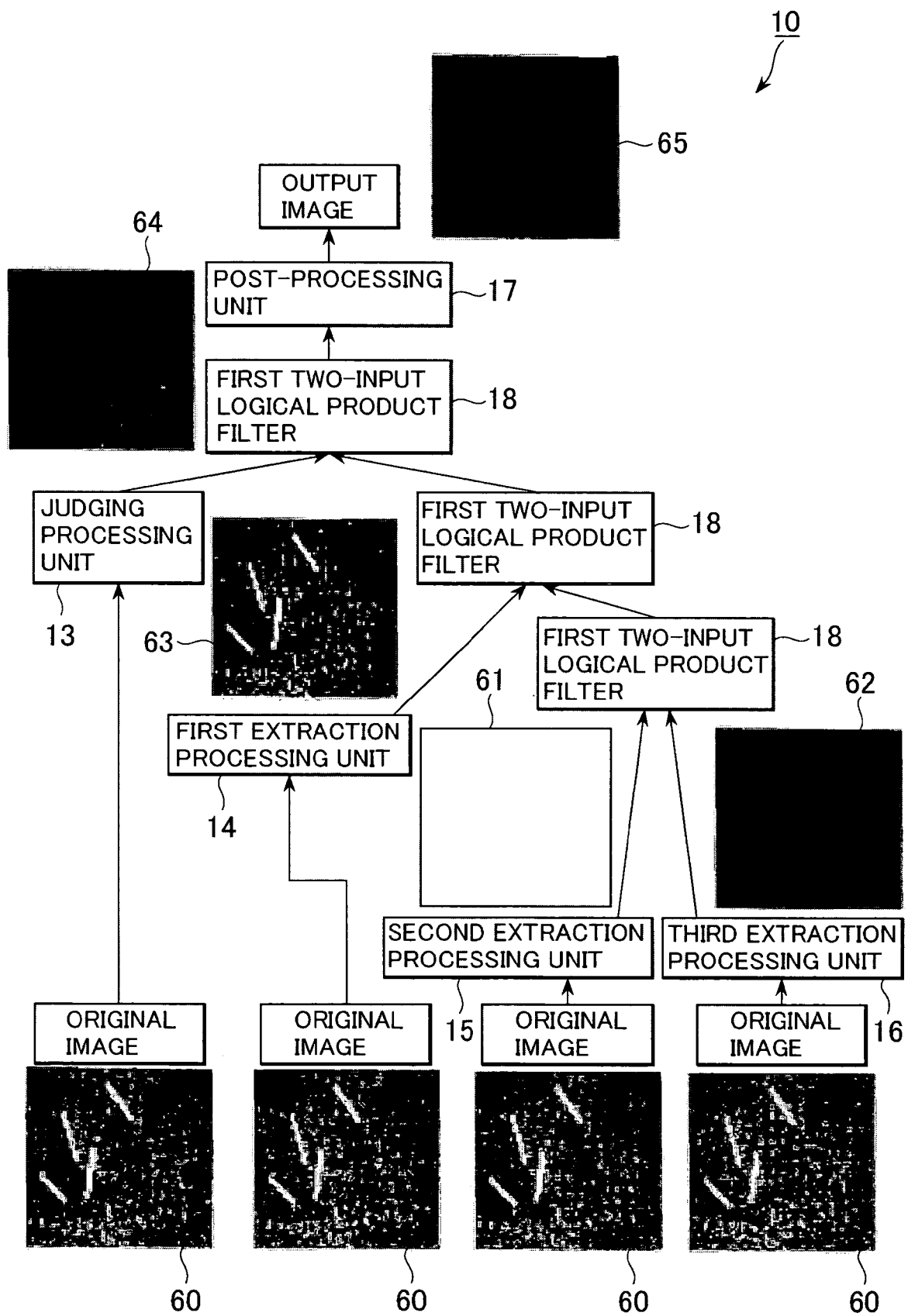
FIG. 13 is a view showing a frame format of image processing, in the case of a circle that is not included in an original image.

When the image of touchdown zone mark of the heliport including a circle greater than or equal to a prescribed size such as the original image 40 shown in FIG. 11 is input to the second extraction processing unit 15, as shown in the image 41, the image including or extracting inside and outside of the circle is output. In addition, when the image of touchdown zone mark of the heliport including a circle less than or equal to a predetermined size such as original image 50 shown in FIG. 12 is input to the second extract processing unit 15, the image shown in the image 51 extracting the inside of circle is output. Furthermore, the image shown in the image 60 having no circle as shown in FIG. 13 is input to the second extraction to processing unit 15, the image for which all gradation value of the image element is 0, such as the image 61, is output.

Next, in the third extraction processing unit 16, at first, the level amendment filter 21 makes the contrast of the original image X clearer, and the edge is detected by the second edge filter 26. After that, noise removing is conducted by the first noise rejection filter 31. And, again, the process to detect the edge by the second edge filter 26 is conducted. By this image processing, when the circle was included in the original image X, only the inside of the circle is extracted.

Next, the original image X and the image conducted to detect the edge again are input into the first two-input logical product filters 18. When there is the circle in the input image, herein, the image processing for extracting only the inside of circle is conducted. And, after described noise is removed with the second noise rejection filter 32 about the image output from the first two-input logical product filter 18, the image is output from the third extract processing unit 16.

When the image with the circle greater than or equal to the prescribed size such as the original image 40 shown in FIG. 11 is input to the third extraction processing unit 16, as shown in the image 42, the image which the circle and the inside of circle are mainly extracted is output. In addition, when the image with the circle less than or equal to the prescribed size such as the original image 50 shown in FIG. 12 is input to the third extraction processing unit 16, also as shown in the image 52, the image which in the circle and the inside of circle are mainly extracted is output. In addition, when the image with no circle as shown in FIG. 13 is input to the third extraction processing unit 16, the output image 62 which gradation value of all pixels are approximately at the absolute maximum gradation value is output.

In the first extraction processing unit 14, the image processing for enhancing an edge in the original image X with the edge enhancement filter 24 is conducted. In addition, the second edge filter 26 detects the edge in the original image X separately. In addition, furthermore, the binarization filter 27 binarizes the original image X separately.

And, both the image enhanced having its edge by the edge enchancement filter 24 and the image that has been edge detected by second edge filter 26 are input into the second two-input logical product filter 29.

By the first two-input logical product filter 18, the logical product of gradation value of a pixel to support the two input images is divided by the greatest gradation value, and the image which assumes the quotient gradation value is output for the image. The process making contrast clearer with the level amendment filter 21 being utilized to process this output image.

Next, after conducting the image processing to make the images contrast clearer with the level amendment filter 21 and the image binarized with the binarization filter 27 they are input into the third two-input logical product filter 30 so as to integrate both images, and the integrated image is output from the first extraction processing unit 14.

When any image, such as the circle in a touchdown zone mark of the heliport image, includes a size greater than or equal to a predetermined size shown like, for example, that shown in the image 40 in FIG. 11, the touchdown zone mark of the heliport image which includes the circle having less than or equal to the predetermined size shown in the image 50 as shown in FIG. 12, or the image with no circle as the original image 60 as shown in FIG. 13 are input to the first extraction processing unit 14, the image which made contrast clearer like the output image 43, 53, 63 is output.

In the judging processing unit 13, after conducting the image processing for making contrast clear about the original image X with the level amendment filter 21, the image processing for setting the gradation of the pixels comprising the contour of the circle which is the extraction target to the absolute maximum gradation value by the configuration filter 22 is conducted. Afterwards, the image processing to clarify contour of the circle by the second edge filter 26 is conducted, and it is output from the judgment processing unit 13.

As described in the above, when the image including the circle such as the image 40 shown in FIG. 11 or the image 50 shown in FIG. 12 is input to the judgment processing filter 13, the image which the gradation value of all pixels are near to absolute maximum gradation value approximately is converted like output images 44 and 54. Conversely, when the image with no circle such as the image 60 shown in FIG. 13 is input to the judgment processing filter 13, the image in which the pixel value of all pixels is near to absolute lowest gradation value like the image 64 is output.

As thus described, the image output from each processing unit is integrated with the first two-input logical product filter 18. At first, the image output from the second extraction processing unit 15 and the image output from the third extraction processing unit 16 is input to the first two-input logical product filter 18 so as to integrate these two images.

Next, the image output from the second extraction processing unit 15 and the image output from the third extraction processing unit 16 are input to the first two-input logical product filter 18, and the image output from the first two-input logical product filter 18 and the image output from the first extraction processing unit are input to the first two-input logical product filter 18 so as to integrate these images and the integrated image is output.

In addition, the image integrated with the image from the first extraction processing unit 14 output from the first two-input logical product filter 18 is input to the first two-input logical product filter with the image output from the judging processing unit 13 so as to integrate these images and the integrated image is output to the post-processing unit 17.

In the post-processing unit 17, the image is binarized by the binarization filter 27 with a predetermined threshold. An inflation image processing to the binarized image is conducted with the inflation filter 33 so as to amend the "slit" "mutilation" or "hole opening" in the image. Next, after grouping with the configuration filter 34, an area of each group is calculated and, furthermore, the mean value of area of each group is preferably calculated. And, the image processing of deleting the group for which the value of area is lower than or equal to the average value of an area is lower than or equal to the average value of an area of each group is conducted. In the image subjected to such image processing, the image processing for shrinking more than one pixel is conducted to the image with the deflation filter 35 and, the conducted image is output.

As thus described, by conducting the image processing with the post-processing unit 17, when the image processing is begun in the first extraction processing unit 14 or the judgment processing unit 13, from the original image 40 shown in FIG. 12, or the original image 50 shown in FIG. 12 including the circle, the approximately circular, and near shape like the output image 45 and output image 55 is extracted. On the contrary, by conducting a similar process as above to the image with no circle, the image like output image 65 for which gradation value of all pixels is 0 is output.

As described above, the image which is subjected to filter processing with a hierarchy structure-shaped filter 10 is output in controlling unit 9. As an example of use of the image processing system, the controlling unit 9, based on the output image, can gain the attention of an operator of the helicopter by, for example, a central warning system such as loud speakers when there is too large a gap or distance between a current position right under the landing helicopter and a position of the proper touchdown zone of the helicopter.

In addition, a preferred embodiment of the invention can display image data taken by the camera 2 by controlling display unit 12. For example, an image data of the extracted pattern (e.g., the detected circle) can be displayed on top the original background data as in one representing a complicated figure.

As mentioned above, in this embodiment, a complicated image processing is facilitated by processing an image via tree structure filter 10, which helps in extracting a particular configuration (e.g., a geometric shape as in a circle) from a complicated figure with clear condition.

In addition, in the above described embodiment for tree structure filter 10, a configuration/process which uses the filter processing for all processing units was explained. However, the image data can be conducted in other ways as in inputting the configuration to two-input logical product filters without putting filter process in extract process. (e.g. presenting a non-filtered original image to a two-input logical filter as in removing the first extraction processing unit 14 and supplying original data directly to first two-input logical product filter 18 together with the output of the other logical filter 18 shown in FIG. 2 receiving input from extraction processing units 15 and 16.)

In addition, the original image X is described above as touchdown zone mark of a heliport, and reference is made to a circle as being extracted in a clear condition when, for example, the configuration which wants to be extracted is a circle. Nevertheless, the present invention is other suited for extracting other configurations from complicated images While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed:

1. An image processing system for detecting a target object from an image data, comprising:
    a first extraction processing unit for extracting the target object in the image data,
    a second extraction processing unit for extracting the target object in the image data,
    a third extraction processing unit for extracting the target object in the image data,
    a judgment processing unit for judging whether the target object is in the image data or not,
    a post-processing unit for extracting the target object in the image data, wherein:
    S1: a first two-input logical product filter conducts the image processing for calculating logical product from the image data processed with the second extraction processing unit and the image data processed with the third extraction processing unit,
    S2: the first two-input logical product filter conducts the image processing for calculating logical product from the image data processed with the first extraction processing unit and the image data processed at S1,
    S3: the first two-input logical product filter conducts the image processing for calculating logical product from the image data processed at S2 and the image data output from the judgment processing unit, and
    the post-processing unit conducts image processing for the image data processed at S3 and outputs the image data thereby.

2. The image processing system according to claim 1, wherein the judgment processing unit includes
    a level amendment filter for making contrast of the image data clear,
    a configuration judgment filter for conducting a prescribed image process to the image data,
    a first edge filter for detecting an edge in the image data, wherein
    the level amendment filter processes the original image data,
    the configuration judgment filter processes the image data processed with the level amendment filter,
    the first edge filter processes the image data processed with the configuration judgment filter, and the judgment processing unit outputs the image data processed with the edge filter.

3. The image processing system according to claim 1, wherein
    the first extraction processing unit includes an edge enhancement filter for enhancing an edge in the image data, a second edge filter for detecting an edge in the image data, a second two-input logical product filter for conducting the image processing by calculating a logical product from two images, a level amendment filter (21) for making contrast of the image data clearer, a binarizing filter for binarizing the image data, and a third two-input logical product filter (30) for conducting the image processing by calculating logical product from two images,
    wherein the edge enhancement filter processes the original image data, the second edge filter processes the original image data, the second two-input logical product filter conducts the image processing from the image data processed with the edge enhancement filter and the image data processed with the second edge filter, the level amendment filter processes the image data processed with the second two-input logical product filter, the binarizing filter processes the original image data, the third two-input logical product filter conducts the image processing based on the image data processed with the level amendment filter and the image data processed with the binarizing filter, and the first extraction processing unit outputs the image data processed with the third two-input logical product filter.

4. The image processing system according to claim 1, wherein
    the second extraction processing unit includes an edge enhancement filter for enhancing edge in the image data, a configuration judgment filter for conducting a prescribed image process to the image data, and a first noise rejection filter for removing noise in the image,
        wherein the edge enhancement filter processes the original image data, the configuration judgment filter processes the image data processed with the edge enhancement filter, the noise rejection filter processes the image data processed with the configuration judgment filter, and the second extracting processing unit outputs the image data processed with the noise rejection filter.

5. The image processing system according to claim 1, wherein
    the third extraction processing unit includes a level amendment filter for making contrast of the image data clear, a second edge filter for detecting edge in the image data, a first noise rejecting filter for removing noise in the image data, the first two-input logical product filter for conducting the image processing by calculating logical product from two images, and a second noise rejecting filter for removing noise in the image data,
    wherein the level amendment filter processes the original image data, the second edge filter processes the image data processed with the level amendment filter, the first noise rejection filter processes the image data processed with the second edge filter, the second edge filter processes the image data processed with the first noise rejection filter, the first two-input logical product filter conducts the image processing from the image data processed with the second edge filter and the original image data, the second noise rejection filter processes the image data processed with the first two-input logical product filter, and the third extraction processing unit outputs the image data processed with the second noise rejection filter.

6. The image processing system according to claim 1, wherein
    the post-processing unit includes a binarizing filter for binarizing the image data, an inflation filter for inflating the image data, a configuration filter for conducting a prescribed image process to the image data, a deflation filter for contracting the image data,
    wherein the binarizing filter processes the image data processed at S3, the inflation filter processes the image data processed with the binarizing filter, the configuration filter processes the image data processed with the inflation filter, the deflation filter processes the image data processed with the configuration filter, and the post-processing unit outputs the image data processed with the deflation filter.

7. The image processing system according to claim 1, wherein
the judgment processing unit includes a configuration judgment filter for conducting a prescribed image process to the image data, and a first edge filter for detecting edge in the image data,
wherein the configuration judgment filter processes the original image data, the first edge filter processes the image data processed with the configuration judgment filter, and the judgment processing unit outputs the image data processed with the edge filter.

8. The image processing system according to claim 1, wherein the first extraction processing unit includes an edge enhancement filter for enhancing edge in the image data, an edge filter for detecting edge in the image data, a second two-input logical product filter for conducting the image processing by calculating logical product from two images, a binarizing filter for binarizing the image data, and a third two-input logical product filter for conducting the image processing by calculating logical product from two images,
wherein the edge enhancement filter processes the original image data, the edge filter processed the original image data, the second two-input logical product filter conducts the image processing from the image data processed with the edge enhancement filter and the image data processed with the edge filter, the binarizing filter processes the original image data, the third two-input logical product filter conducts the image processing based on the image data processed with the second two-input logical product filter and the image data processed with the binarizing filter, and the first extraction processing unit outputs the image data processed with the third two-input logical product filter.

9. The image processing system according to claim 1, wherein
the second extraction processing unit includes an edge enhancement filter for enhancing edge in the image data, and a configuration judgment filter for conducting a prescribed image process to the image data,
wherein the edge enhancement filter processes the original image data, the configuration judgment filter processes the image data processed with the edge enhancement filter, and the second extracting processing unit outputs the image data processed with the configuration judgment filter.

10. The image processing system according to claim 1, wherein the third extraction processing unit includes a second edge filter for detecting edge in the image data, and the first two-input logical product filter for conducting the image processing by calculating logical product from two images, wherein
the second edge filter processes the image data processed with the original image data, the second edge filter processes the image data processed with the edge filter, and the first two-input logical product filter conducts the image processing from the image data processed with the second edge filter and the original image data.

11. The image processing system according to claim 1, wherein
the target object is the specific configuration in a touchdown zone mark of a heliport.

12. The image processing system according to claim 11 further comprising a warning system for when image processing detects an improper touchdown situation between a vehicle landing at said heliport and the touchdown zone mark.

13. The image processing system according to claim 1, wherein said specific configuration is a geometric shape within a background image.

14. The image processing system according to claim 1 further comprising a display for depicting an extracted image on a modified background.

15. The image processing system according to claim 1, wherein the specific configuration is a circle included in the touchdown zone mark of a heliport.

16. The image processing system according to claim 1 wherein said specific configuration is a landing zone for a vehicle.

17. An image processing system for detecting a target object from an image data, comprising:
a first extraction processing unit for extracting the target object in the image data,
a second extraction processing unit for extracting the target object in the image data,
a third extraction processing unit for extracting the target object in the image data,
a judgment processing unit for judging whether the target object is in the image data or not,
a post-processing unit for extracting the target object in the image data, said post-processing unit receiving data from two-input logical product filtering means provided to carry out the following steps S1 to S3;
S1: image processing for calculating logical product from the image data processed with the second extraction processing unit and the image data processed with the third extraction processing unit,
S2: image processing for calculating logical product from the image data processed with the first extraction processing unit and the image data processed at S1,
S3: image processing for calculating logical product from the image data processed at S2 and the image data output from the judgment processing unit, and
the post-processing unit conducts image processing for the image data processed at S3 and outputs the image data thereby.

18. The image processing system according to claim 17, wherein the judgment processing unit includes
a level amendment filter for making contrast of the image data clear,
a configuration judgment filter for conducting a prescribed image process to the image data,
a first edge filter for detecting an edge in the image data, wherein
the level amendment filter processes the original image data,
the configuration judgment filter processes the image data processed with the level amendment filter,
the first edge filter processes the image data processed with the configuration judgment filter, and the judgment processing unit outputs the image data processed with the edge filter.

19. The image processing system according to claim 17, wherein
the second extraction processing unit includes an edge enhancement filter for enhancing edge in the image data, a configuration judgment filter for conducting a prescribed image process to the image data, and a first noise rejection filter for removing noise in the image,
wherein the edge enhancement filter processes the original image data, the configuration judgment filter processes the image data processed with the edge enhancement filter, the noise rejection filter processes the image data processed with the configuration judgment filter, and the second extracting processing unit outputs the image data processed with the noise rejection filter.

20. An image processing system for detecting a target object from an image data, comprising:
- a first extraction processing unit for extracting the target object in the image data,
- a second extraction processing unit for extracting the target object in the image data,
- a third extraction processing unit for extracting the target object in the image data,
- a judgment processing unit for judging whether the target object is in the image data or not,
- a post-processing unit for extracting the target object in the image data, wherein data is received by said post-processing unit based on S1 to S3 ; wherein
- S1: involves first two-input logical product filtering involving conducting image processing for calculating logical product from the image data processed with the second extraction processing unit and the image data processed with the third extraction processing unit,
- S2: involves first two-input logical product filtering involving conducting the image processing for calculating logical product from the image data processed with the first extraction processing unit and the image data processed at S1,
- S3: involves first two-input logical product filtering involving conducting the image processing for calculating logical product from the image data processed at S2 and the image data output from the judgment processing unit, and
- the post-processing unit conducts image processing for the image data processed at S3 and outputs the image data thereby.

* * * * *